(12) United States Patent
Crosby et al.

(10) Patent No.: US 9,395,232 B2
(45) Date of Patent: Jul. 19, 2016

(54) DETECTION OF CONTAMINATION STATUS FOR REFRIGERATOR ULTRASONIC SENSOR ASSEMBLY

(71) Applicant: General Electric Company, Schenectady, NY (US)

(72) Inventors: Jonathan Charles Crosby, Louisville, KY (US); Tyler James Doering, Louisville, KY (US); Joseph Thomas Waugh, Louisville, KY (US)

(73) Assignee: General Electric Company, Schenectady, NY (US)

( * ) Notice: Subject to any disclaimer, the term of this patent is extended or adjusted under 35 U.S.C. 154(b) by 366 days.

(21) Appl. No.: 13/956,479

(22) Filed: Aug. 1, 2013

(65) Prior Publication Data

US 2015/0033822 A1 Feb. 5, 2015

(51) Int. Cl.
*G01F 25/00* (2006.01)
*G01F 23/296* (2006.01)

(52) U.S. Cl.
CPC ........ *G01F 25/0061* (2013.01); *G01F 23/2962* (2013.01)

(58) Field of Classification Search
CPC .................. G01S 7/52004; G01S 2007/52009; G01S 15/04; G01S 15/88; G01S 7/521; B67D 1/124; F25D 2700/06; G01D 5/48; G01F 23/296; G01F 23/2962; G01F 25/0061; G01F 25/00
See application file for complete search history.

(56) References Cited

U.S. PATENT DOCUMENTS

| | | | |
|---|---|---|---|
| 6,568,270 | B2 | 5/2003 | Hongerholt |
| 6,765,491 | B1 * | 7/2004 | Nass .................... G01S 7/52004 340/686.6 |
| 7,743,801 | B2 | 6/2010 | Janardhanam et al. |
| 8,028,728 | B2 | 10/2011 | Cooper |
| 8,353,321 | B2 | 1/2013 | Agam et al. |
| 2009/0306897 | A1 | 12/2009 | Dong et al. |
| 2010/0071471 | A1 * | 3/2010 | Matsumoto ............. G01S 7/527 73/627 |

FOREIGN PATENT DOCUMENTS

KR 100304893 7/2001

* cited by examiner

*Primary Examiner* — Daniel S Larkin
*Assistant Examiner* — Jamar Ray
(74) *Attorney, Agent, or Firm* — Dority & Manning, P.A.

(57) ABSTRACT

Systems and methods for detecting a contamination status of an ultrasonic sensor assembly included in a refrigeration appliance are provided. An exemplary refrigerator includes a sensor assembly. The sensor assembly includes a first ultrasonic sensor configured to transmit an ultrasonic signal and a second ultrasonic sensor configured to receive the ultrasonic signal. The refrigerator is configured to perform operations comprising detecting whether the sensor assembly is contaminated based on one or more characteristics of the received ultrasonic signal. An exemplary method includes monitoring a change in a characteristic of a plurality of crosstalk components of a plurality of ultrasonic signals of over a period of time to detect a contaminated state of an ultrasonic sensor.

14 Claims, 7 Drawing Sheets

DETECTION OF CONTAMINATION STATUS FOR REFRIGERATOR ULTRASONIC SENSOR ASSEMBLY

FIELD OF THE INVENTION

The present disclosure relates to ultrasonic sensor assemblies. More particularly, the present disclosure relates to systems and methods for detecting a contamination status of an ultrasonic sensor assembly included in a refrigeration appliance.

BACKGROUND OF THE INVENTION

Certain refrigerator appliances include a dispensing assembly for dispensing ice and/or liquid water. Such dispensing assemblies generally include an actuator, such as a button or paddle, or a sensor assembly, such as an ultrasonic sensor assembly, for initiating a flow of ice and/or liquid water into a dispenser recess of the dispensing assembly. By pressing the actuator or triggering the sensor, a user can initiate the flow of ice and/or liquid water into a container, such as a cup or pitcher, positioned within the dispenser recess.

Certain dispensing assemblies having ultrasonic sensors also include features for automatically filling the container with ice and/or liquid water. The ultrasonic sensor can be operated to monitor a level of ice and/or liquid water within the container, and the dispensing assembly can terminate the flow of ice and/or liquid water into the container when the container is full or at a predetermined level. For such auto-fill features to operate properly, the ultrasonic sensor measures the container and its contents accurately and precisely. In particular, ultrasonic sensors can measure various parameters of the container in order to automatically fill the container with ice and/or liquid water. Such parameters can include an alignment of the container, a location of a container lip, a location of a container bottom, and a height of liquid water and/or ice within the container relative to the container lip or container bottom.

However, ultrasonic sensors can have difficulty accurately and precisely measuring such parameters. In particular, under certain usage conditions, ultrasonic sensors can become contaminated with foreign material including, but not limited to, colas, juices, food particles, or other contaminants or pollutants. For example, such contaminants can become affixed to or otherwise impair or inhibit proper operation of the ultrasonic sensor assembly.

Operation of the ultrasonic sensor assembly while in a contaminated state (i.e. with substantial contaminants present) can result in decreased performance. For example, a contaminated ultrasonic sensor assembly may exhibit increased detection of false positives, failure to detect an object at all, or other improper operations.

In turn, such difficulty can lead to user frustration and dissatisfaction because the automatic fill process may not operate properly due to unacceptable measurements from the ultrasonic sensor assembly. For example, in the context of auto-fill features in a refrigerator, false positives can fool the dispensing assembly into believing that a larger container is present than there actually is, and therefore lead to over-fills and spillage. As another example, false positives may result in the dispensing assembly believing a container to be completely filled with ice or liquid, when in fact it remains empty.

Therefore, improved systems and methods for detecting a contamination status of an ultrasonic sensor assembly included in a refrigeration appliance are desirable.

BRIEF DESCRIPTION OF THE INVENTION

Aspects and advantages of the invention will be set forth in part in the following description, or may be obvious from the description, or may be learned through practice of the invention.

One aspect of the present disclosure is directed to a refrigerator. The refrigerator includes a sensor assembly. The sensor assembly includes a first ultrasonic sensor configured to transmit an ultrasonic signal and a second ultrasonic sensor configured to receive the ultrasonic signal. The refrigerator is configured to perform operations comprising detecting whether the sensor assembly is contaminated based on one or more characteristics of the received ultrasonic signal.

Another aspect of the present disclosure is directed to a method for determining a contamination status of an ultrasonic sensor assembly included in a refrigerator appliance. The method includes operating the ultrasonic sensor assembly to send and receive one or more ultrasonic signals. The method includes comparing an amount of received crosstalk to a threshold value. The method includes determining the contamination status of the ultrasonic sensor assembly based on the comparison of the amount of received crosstalk to the threshold value.

Another aspect of the present disclosure is directed to a method for operating an appliance. The method includes transmitting, over a period of time, a plurality of ultrasonic signals from an ultrasonic transducer included in the appliance. The method includes respectively receiving the plurality of ultrasonic signals at an ultrasonic detector included in the appliance. The method includes determining, for each of the plurality of ultrasonic signals, a characteristic of a crosstalk component in each received ultrasonic signal. The method includes monitoring a change in the characteristic of the crosstalk components over the period of time to detect a contaminated state of at least one of the ultrasonic transducer or the ultrasonic detector.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
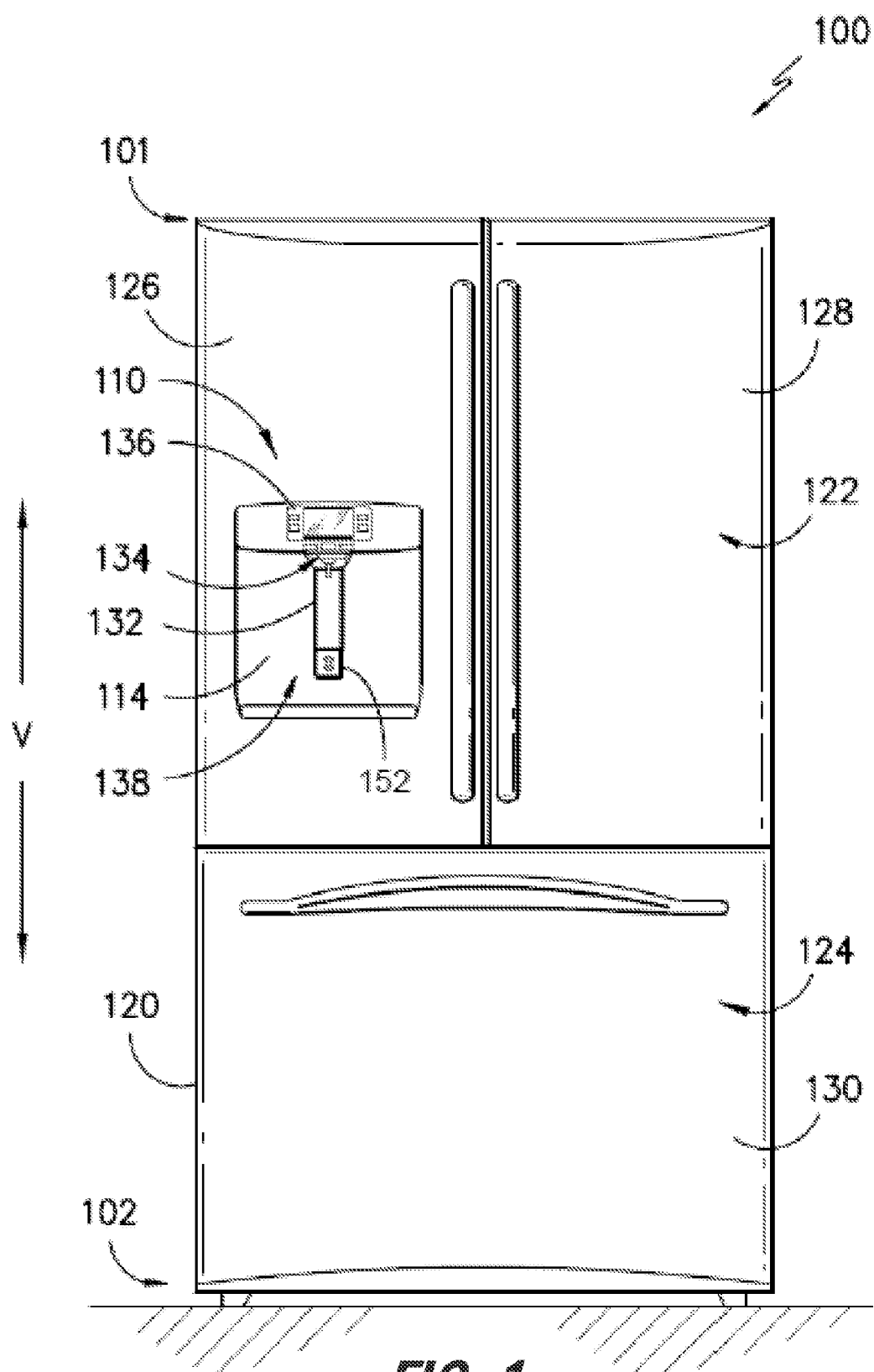
FIG. 1 provides a front, elevation view of an exemplary refrigerator appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, elevation view of an exemplary refrigerator appliance 100 according to an exemplary embodiment of the present disclosure. Refrigerator appliance 100 defines a vertical direction V and extends between an upper portion 101 and a lower portion 102 along the vertical direction V. Refrigerator appliance 100 includes a cabinet or housing 120 that defines chilled chambers for receipt of food items for storage. In particular, refrigerator appliance 100 defines a fresh food chamber 122 at upper portion 101 of refrigerator appliance 100 and a freezer chamber 124 arranged below fresh food chamber 122 on the vertical direction V, e.g., at lower portion 102 of refrigerator appliance 100. As such, refrigerator appliance 100 is generally referred to as a bottom mount refrigerator appliance. However, using the teachings disclosed herein, one of skill in the art will understand that the present subject matter can be used with other types of refrigerator appliances (e.g., side-by-side style or top mount style); a freezer appliance; or any other type of appliance as well. Consequently, the description set forth herein is for illustrative purposes only and is not intended to limit the present subject matter in any aspect.

Refrigerator doors 126 and 128 are rotatably hinged to an edge of housing 120 for accessing fresh food compartment 122. A freezer door 130 is arranged below refrigerator doors 126 and 128 for accessing freezer chamber 124. Freezer door 130 is coupled to a freezer drawer (not shown) slidably mounted within freezer chamber 124.

Refrigerator appliance 100 also includes a dispensing assembly 110 for dispensing water and/or ice. Dispensing assembly 110 includes a dispenser 114 positioned on or mounted to an exterior portion of refrigerator appliance 100, e.g., on refrigerator door 126. Dispenser 114 includes a discharging outlet 134 for accessing ice and water. A paddle or actuator 132 is mounted below discharging outlet 134 for operating dispenser 114. In alternative exemplary embodiments, any suitable actuator may be used to operate dispenser 114, such as a button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and actuator 132 are an external part of dispenser 114 and are mounted in a dispenser recess 138 defined in an outside surface of refrigerator door 126. Dispenser recess 138 is positioned at a predetermined elevation convenient for a user to access ice or water and enabling the user to access ice without the need to bend-over and without the need to access freezer chamber 124. In the exemplary embodiment, dispenser recess 138 is positioned at a level that approximates the chest level of a user.

Dispenser assembly 110 also includes a first ultrasonic sensor assembly 152 mounted to dispenser 114 and positioned within or adjacent dispenser recess 138. First ultrasonic sensor assembly 152 is directed towards dispenser recess 138 and is configured for detecting a container within dispenser recess 138. An exemplary ultrasonic sensor assembly is discussed in greater detail below.

Figure 2:
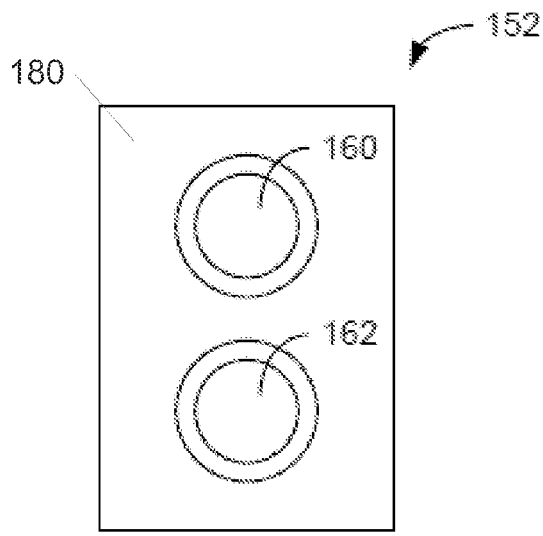
FIG. 2 provides a front, elevation view of an exemplary ultrasonic sensor assembly of the exemplary refrigerator appliance of FIG. 1 according to an exemplary embodiment of the present disclosure.

FIG. 2 provides a front, elevation view of an exemplary ultrasonic sensor 152 of the exemplary refrigerator appliance 100 of FIG. 1 according to an exemplary embodiment of the present disclosure. First ultrasonic sensor assembly 152 includes an ultrasonic transducer 160 and an ultrasonic detector 162 for detecting a proximity or location of a container within dispenser recess 138. Ultrasonic transducer 160 is configured for generating high frequency sound waves (i.e. ultrasonic signals) and directing such sound waves towards dispenser recess 138 and objects located therein. Conversely, ultrasonic detector 162 is configured for detecting any high frequency sound waves reflected back towards first ultrasonic sensor assembly 152 by objects within dispenser recess 138. As will be understood by those skilled in the art, the location, shape, alignment, or contents of a container within dispenser recess 138 may be determined by the amount of time between when ultrasonic transducer 160 sends out an ultrasonic sound wave and when ultrasonic detector 162 detects a reflection of such ultrasonic sound wave.

Ultrasonic transducer 160 and ultrasonic detector 162 can be mounted within a chassis 180. Chassis 180 can include various components, such as, for example, a face plate, a base plate, and a support plate. For example, ultrasonic transducer 160 and ultrasonic detector 162 can each be coaxially encircled by an isolation boot. The two isolation boots can be supported between the base plate and the support plate of chassis 180. However, the present disclosure is not limited to any particular configuration or implementation.

According to an aspect of the present disclosure, when ultrasonic transducer 160 generates or otherwise transmits an ultrasonic signal, a certain amount of crosstalk will be received by the ultrasonic detector 162.

Crosstalk can include any portion of the transmitted ultrasonic signal that travels directly from ultrasonic transducer 160 to ultrasonic detector 162 without having reflected off a surface or object. For example, crosstalk can include the portion of the signal that bypasses the target object and travels directly from ultrasonic transducer 160 to ultrasonic detector 162.

As another example, crosstalk can include vibrations that travel from ultrasonic transducer 160 to ultrasonic detector 162 through chassis 180. In particular, although care may be taken to isolate ultrasonic transducer 160 and ultrasonic detector 162 from chassis 180, transmission of an ultrasonic signal from ultrasonic transducer 160 can still result in a certain amount of vibration travelling through chassis 180 and registering at ultrasonic detector 162, causing the received ultrasound signal to include a crosstalk component.

Figure 3:
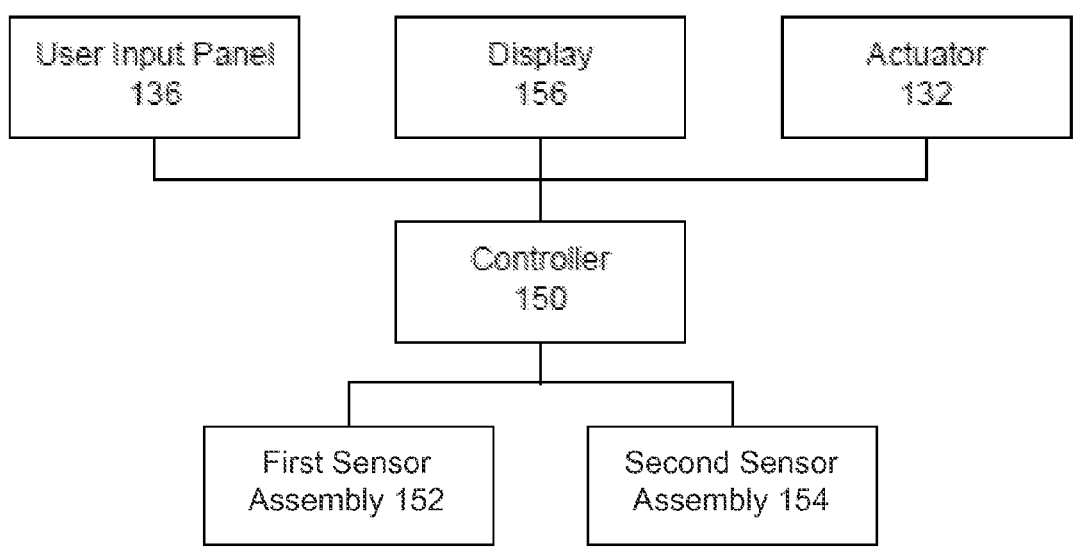
FIG. 3 provides a schematic view of the exemplary refrigerator appliance of FIG. 1 according to an exemplary embodiment of the present disclosure.

FIG. 3 provides a schematic view of the exemplary refrigerator appliance 100 of FIG. 1 according to an exemplary embodiment of the present disclosure. As may be seen in FIG. 3, refrigerator appliance 100 also includes a second ultrasonic sensor assembly 154. Second ultrasonic sensor assembly 154 may be constructed in a similar manner to first ultrasonic sensor assembly 152 and include a similar ultrasonic transducer and ultrasonic detector. Thus, second ultrasonic sensor assembly 154 may operate in a similar manner to first ultrasonic sensor assembly 152. Like first ultrasonic sensor assembly 152, second ultrasonic sensor assembly 154 is directed towards dispenser recess 138 and is configured for detecting a container within dispenser recess 138.

As an example, second ultrasonic sensor assembly 154 can be mounted to dispenser 114, e.g., above dispenser recess 138 along the vertical direction V or adjacent discharging outlet 134. Second ultrasonic sensor assembly 154 can be configured for detecting and/or locating a lip or a bottom of a container within dispenser recess 138. Second ultrasonic sensor assembly 154 can also be configured for determining a height of contents within the container, e.g., relative to the lip or the bottom of the container. As noted, refrigerator appliance 100 also includes features for automatically filling a container within dispenser recess 138 with ice and/or liquid water. First and second ultrasonic sensor assemblies 152 and 154 can assist with such automatic filling, e.g., by sensing or detecting the container within dispenser recess 138 and locating specific portions of the container or contents of the container.

Refrigerator appliance 100 further includes a controller 150. Operation of the refrigerator appliance 100 is regulated by controller 150 that is operatively coupled to control panel 138. In one exemplary embodiment, control panel 138 may represent a general purpose I/O ("GPIO") device or functional block. As discussed in greater detail below, control panel 138 includes input components, such as one or more of a variety of electrical, mechanical or electro-mechanical input devices including rotary dials, push buttons, and touch pads. Control panel 138 may be in communication with controller 150 via one or more signal lines or shared communication busses.

Control panel 138 provides selections for user manipulation of the operation of refrigerator appliance 100. In response to user manipulation of the control panel 138, controller 150 operates various components of refrigerator appliance 100. For example, controller 150 is operatively coupled or in communication with actuator 132, user input panel 136, first ultrasonic sensor assembly 152, and second ultrasonic sensor assembly 154, such that controller 150 can operate such components. In particular, controller 150 is in communication with first and second ultrasonic sensor assemblies 152 and 154 and may receive signals from such components. Controller 150 can receive such signals in order to detect or locate a container within dispenser recess 138 as discussed above.

Controller 150 includes memory and one or more processing devices such as microprocessors, CPUs or the like, such as general or special purpose microprocessors operable to execute programming instructions or micro-control code associated with operation of refrigerator appliance 100. In particular, one or more modules can be stored in memory and implemented by controller 150 in order to perform aspects of the present disclosure, including analyzing waveforms of received ultrasonic signals to determine a contamination status of either first ultrasonic sensor assembly 152 or second ultrasonic sensor assembly 154

The memory can include random access memory such as DRAM, or read only memory such as ROM, or FLASH. The processor executes programming instructions stored in the memory. The memory can be a separate component from the processor or can be included onboard with the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 4:
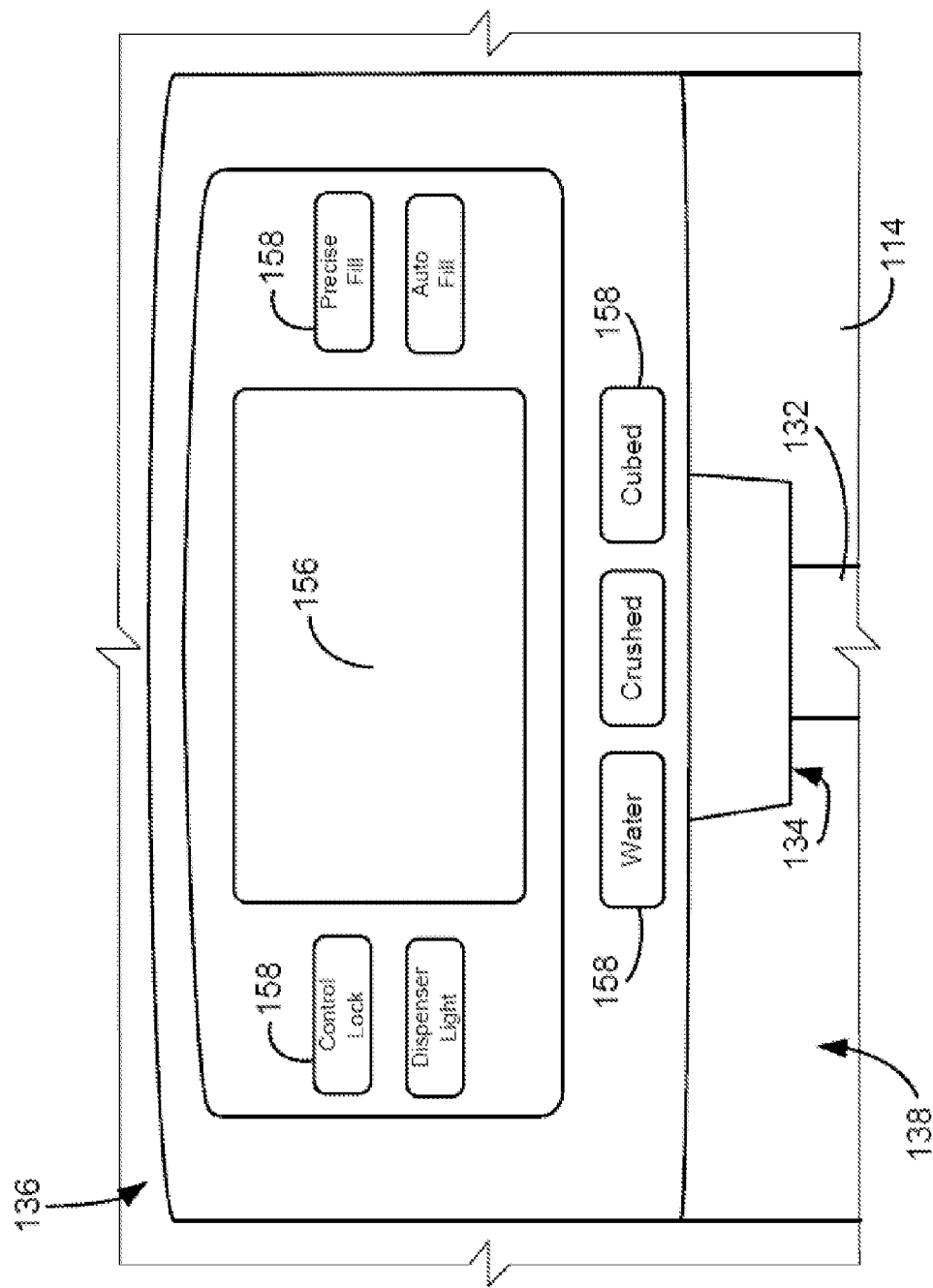
FIG. 4 provides a partial front, elevation view of an exemplary dispenser of the exemplary refrigerator appliance of FIG. 1 according to an exemplary embodiment of the present disclosure.

FIG. 4 provides a partial front, elevation view of an exemplary dispenser 114 of the exemplary refrigerator appliance 100 of FIG. 1 according to an exemplary embodiment of the present disclosure. As may be seen in FIG. 4, control panel 136 of dispenser 114 includes a display 156. Display 156 is configured for presenting or displaying messages thereon, such as a message informing the user that one or more of the sensor assemblies are contaminated and require cleaning. The message can further provide instructions for performing such cleaning. Display 156 can be any suitable device for displaying an image. For example, display 156 can be a liquid crystal display or a plasma display.

Control panel 136 also includes a plurality of user inputs 158. User inputs 158 may be any suitable device for permitting a user to input commands to controller 150. For example, user inputs 158 can be electrical, mechanical or electro-mechanical input devices including rotary dials, push buttons, and touch pads or combinations thereof. Each user input of user inputs 158 corresponds to a particular command or instruction for controller 150. For example, as may be seen in FIG. 4, one of user inputs 158 is configured for selecting dispensing of crushed ice. Similarly, another one of user inputs 158 is configured for selecting dispensing of cubed ice, and yet another one of user inputs 158 is configured for selecting dispensing of liquid water. An additional one of user inputs 158 is configured for initiating automatic filling of a container positioned within dispenser recess 138.

Figure 5:
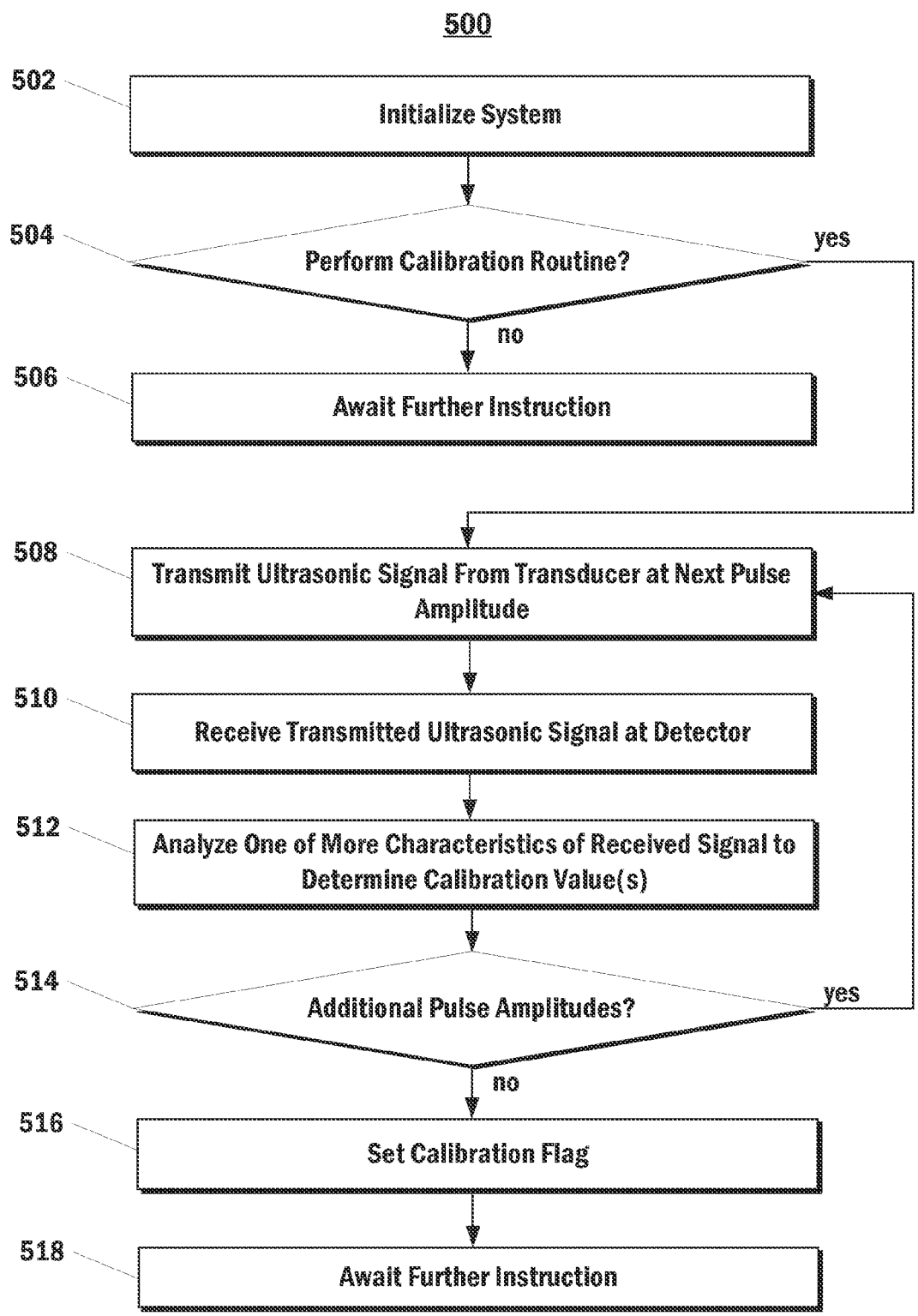
FIG. 5 provides a flowchart of an exemplary method for calibrating an ultrasonic sensor assembly according to an exemplary embodiment of the present disclosure.

FIG. 5 provides a flowchart of an exemplary method (500) for calibrating an ultrasonic sensor assembly according to an exemplary embodiment of the present disclosure. Method (500) can be implemented using any suitable appliance or other device, including, for example, refrigerator 100 of FIG. 1. In addition, FIG. 5 depicts steps performed in a particular order for purposes of illustration and discussion. Those of ordinary skill in the art, using the disclosures provided herein, will understand that the various steps method (500) can be omitted, adapted, and/or rearranged in various ways without departing from the scope of the present disclosure.

At (502) the system is initialized. For example, the refrigerator 100 can be powered on at (502). As another example, dispensing assembly 110 can be powered on or otherwise initialized at (502).

At (504) it is determined whether a calibration routine should be performed. As an example, refrigerator 100 can be configured to perform a calibration routine with respect to either or both of first sensor assembly 152 or second sensor assembly 154 upon an inaugural system initialization. In other words, when refrigerator 100 powers on for the first time, either during manufacture or after placement within the end-user's facility, refrigerator 100 can perform a number of calibration routines, including method (500) to calibrate any ultrasonic sensors. In some embodiments, calibration routines can be performed after an ultrasonic sensor assembly has been cleaned, adjusted, replaced, or otherwise reconfigured.

Thus, at (504) it can be determined whether such a calibration routine should be performed. For example, a calibration flag can be checked or considered by the system. If it is determined at (504) that a calibration routine is not desired, then method (500) can proceed to (506) and await further instructions or perform other processes. However, if it is determined at (504) that a calibration routine should be performed, then method (500) can proceed to (508).

At (508) an ultrasonic signal can be transmitted by an ultrasonic transducer at a first pulse amplitude. More particularly, according to an aspect of the present disclosure, at each instance in which an ultrasonic sensor assembly is used to scan for the presence of an object or is subject to a calibration routine, a plurality of ultrasonic signals can be transmitted. Further, each of the plurality of ultrasonic signals can be transmitted at a different pulse amplitude. In other words, the ultrasonic sensor assembly can transmit a first ultrasonic signal at a first pulse amplitude; receive the first ultrasonic signal; transmit a second ultrasonic signal at a second pulse amplitude; receive the second ultrasonic signal; and so on until the appropriate number of ultrasonic signals has been transmitted.

Thus, for each instance of scanning performed by the ultrasonic sensor assembly, any number of signals of any pulse amplitude can be employed. Therefore, at (508) an ultrasonic signal can be transmitted by the ultrasonic transducer at the next pulse amplitude. For example, an ordering or list of pulse amplitudes can be accessed from memory to inform the system of the next pulse amplitude at which an ultrasonic signal should be transmitted.

At (510) the ultrasonic signal transmitted at (508) is received at an ultrasonic detector. For example, an ultrasonic signal can be transmitted by ultrasonic transducer 160 and received by ultrasonic detector 162. One of skill in the art will appreciate that ultrasonic detector 162 can receive the ultrasonic signal in the form of mechanical waves and transform such received mechanical waves into an electrical signal having varying voltage over time. Thus, an amplitude of the received signal can be proportionally transformed into a voltage.

Figure 6:
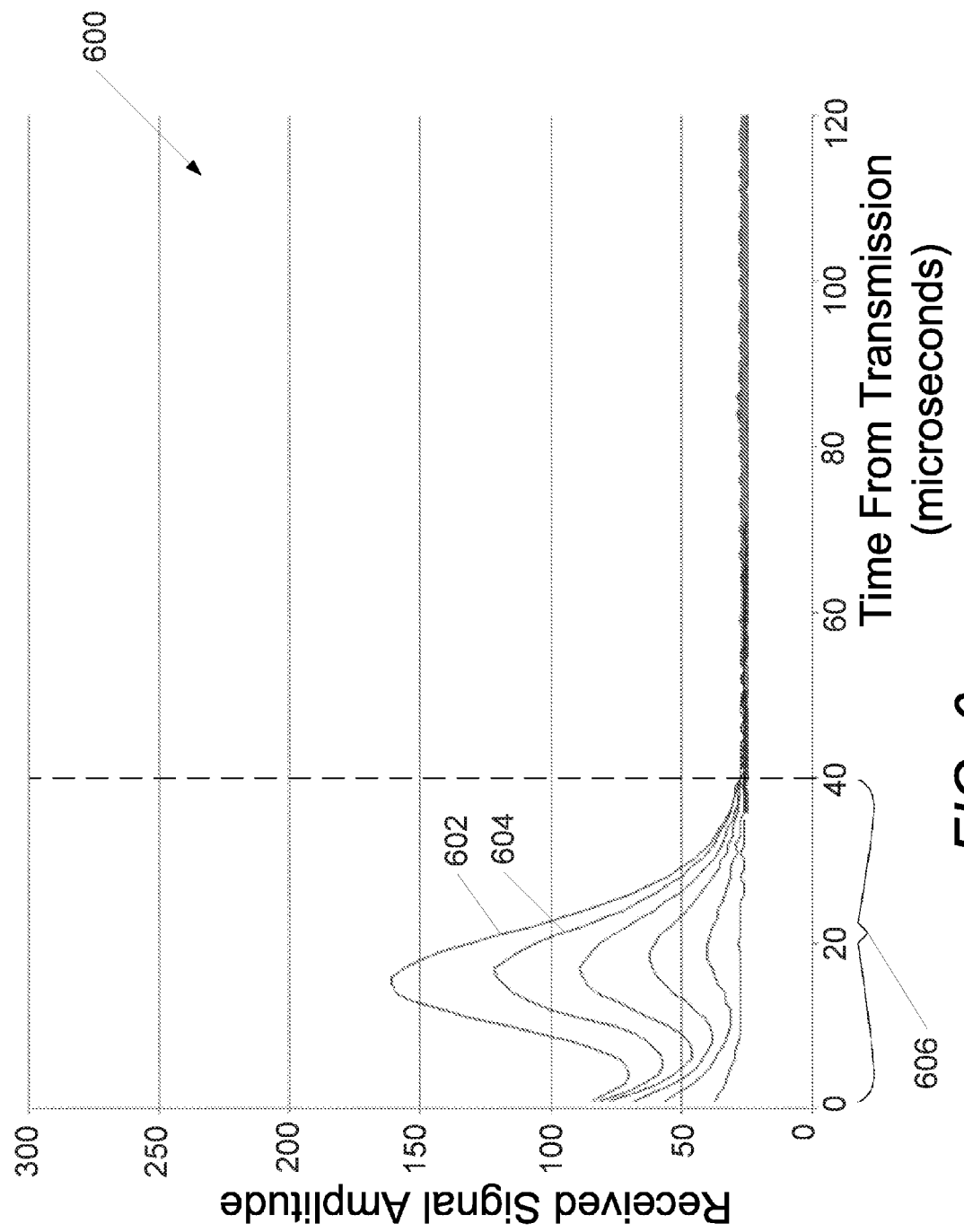
FIG. 6 provides a graphical depiction of a plurality of received ultrasonic signals according to an exemplary embodiment of the present disclosure.

As an example, FIG. 6 provides a graphical depiction 600 of a plurality of received ultrasonic signals according to an exemplary embodiment of the present disclosure. In particular, the plurality of received ultrasonic signals depicted in FIG. 6 have been transmitted and received by a clean (i.e. non-contaminated) ultrasonic sensor assembly. Thus, graphical depiction 600 shows representative waveforms of ultrasonic signals that would be received during a calibration routine such as method (500).

On the y-axis of graphical depiction 600 is the received signal amplitude. For example, plots 602 and 604 respectively depict received signal amplitude for two received ultrasonic signals. The two received signals represented by plots 602 and 604 have been transmitted at two different pulse amplitudes.

Shown on the x-axis of graphical depiction 600 are units of time in microseconds. In particular, the x-axis shows the respective time from transmission for each of the received signals depicted. It will be appreciated that the depicted ultrasonic signals are not necessarily transmitted or received simultaneously, but instead transmitted sequentially and then graphically overlaid so that equivalent times from respective transmissions are aligned.

It will further be understood by one of skill in the art that the presence and location of an object near the ultrasonic sensor assembly can be determined by an amount of time between the time of transmission of an ultrasonic signal and a time at which received signal amplitude demonstrates an identifiable spike or relatively significant increase and decrease. In particular, relative spikes in received signal amplitude can be the result of the ultrasonic signal reflecting off an object and returning to the ultrasonic detector. Thus, an object that is closer to the sensor assembly will result in a relative spike in received signal amplitude at an earlier time while an object that is farther away from the sensor assembly will result in a relative spike in received signal amplitude at a later time, as understood by one of skill in the art.

Furthermore, it is important to note that the particular waveforms, numerical values, and other information included in graphical depictions 600, 800 and 900 are provided only for the purposes of illustrating and explaining the present disclosure. In particular, received signal amplitudes are highly dependent upon the particular configuration of ultrasonic sensors, dispenser recess, and other components of the refrigerator and, therefore, can vary greatly as various configurations are employed to practice the present disclosure. As such, in no way is the present disclosure limited to the particular numerical values, waveforms, or other information provided in graphical depictions 600, 800, and 900.

Returning to FIG. 5, at (512) one of more characteristics of the ultrasonic signal received at (510) can be analyzed to determine one or more calibration value(s). In particular, the received ultrasonic signal can be analyzed to determine an amount of received crosstalk.

As an example, referring again to FIG. 6, it can be seen that plots 602 and 604 each show a relative spike (i.e. relatively significant increase then decrease) in received signal amplitude from around 5 microseconds to around 30 microseconds after their respective times of transmission. Such relative spike results from crosstalk received by the ultrasonic detector from the ultrasonic transducer.

In contrast to the received crosstalk, an object present in the dispenser recess will generally result in a relative spike being observed at a later point in time, as the ultrasonic signal will be required to travel to the object, be reflected by the object, and then travel back to the ultrasonic detector. Thus, with particular exemplary reference to graphical depiction 600, an object present in the dispenser recess can result in a relative spike being observed generally after 40 microseconds but prior to 120 microseconds or some other suitable time interval, such as, for example, between 80 and 100 microseconds. As can be seen in FIG. 6, no such relative spike is seen during such time interval. Therefore, it can be concluded that an object was not present in the dispenser recess.

Thus, according to an aspect of the present disclosure, a received ultrasonic signal can be segmented into two or more components As an example, plot 602 can be segmented into a crosstalk component and an object detection component. The crosstalk component can be the portion of the signal that is received during a deadband delay 606. The object detection component can be the portion of the signal that is received after the expiration of the deadband delay 606.

More particularly, the deadband delay 606 can be an adjustable system parameter that is used to protect against false positives. Thus, the system can be configured so that it does not interpret relative spikes exhibited during the deadband delay 606 as corresponding to or resulting from objects present in the dispenser recess. Therefore, the relative spike resulting from the received crosstalk will not result in a false detection. As shown in FIG. 6, an exemplary deadband delay 606 has been set to 40 microseconds from the time of transmission. Furthermore, although a single deadband delay 606 is shown in FIG. 6, a different deadband delay can be used for each pulse amplitude at which an ultrasonic signal is transmitted.

According to another aspect of the present disclosure, one or more characteristics of each of the received ultrasonic signals can be analyzed to determine one or more calibration values. For example, exemplary characteristics of the signal represented by plot 602 that can be analyzed include, but are not limited to, a maximum received signal amplitude exhibited during a particular time interval; the received signal amplitude exhibited at a specific time from transmission (e.g. 35 microseconds); a total area under plot 602 during a particular time interval; an average value during a particular time interval; or any other suitable received signal characteristics, including values of frequency, amplitude, or other signal components.

One or more calibration values can be determined based on each analyzed characteristics. As an example, the analyzed characteristic can itself be used as the calibration value. For example, the received signal amplitude exhibited at a specific time from transmission can simply be stored as the calibration value. As another example, the analyzed characteristic can be used to compute the calibration value. For example, the received signal amplitude exhibited at the specific time from transmission can be entered into a transfer function to generate the calibration value. In one implementation, the calibration value is equal to the received signal amplitude that is exhibited at a specific time from transmission multiplied by a coefficient, such as, for example, 1.5.

Returning to FIG. 5, after the calibration value is determined and stored at (512), it can be determined at (514) whether additional ultrasonic signals should be transmitted at additional pulse amplitudes. A list or ordering stored in memory can be accessed or consulted to aid the determination at (514).

If it is determined at (514) that additional ultrasonic signals should be transmitted, then method (500) can return to (508) and transmit an ultrasonic signal from the ultrasonic transducer at the next pulse amplitude. In such fashion, at least one calibration value can be determined for each pulse amplitude during method (500).

However, if it is determined at (514) that additional ultrasonic signals are not desired, then method (500) can proceed to (516). At (516) a calibration flag can be set to indicate that the calibration procedure has been completed. For example, the flag can be set to one. Thus, upon subsequent system initializations, the calibration flag can be read and the calibration routine will not be performed again. The calibration flag can be cleared or set to zero after a refrigerator system reset, a dispensing system reset, or after one or more of the ultrasonic sensor assemblies have been adjusted, cleaned, replaced, or reconfigured. Therefore, after such occurrences, the system can be recalibrated. At (518) the system awaits further instructions or performs other processes.

Figure 7:
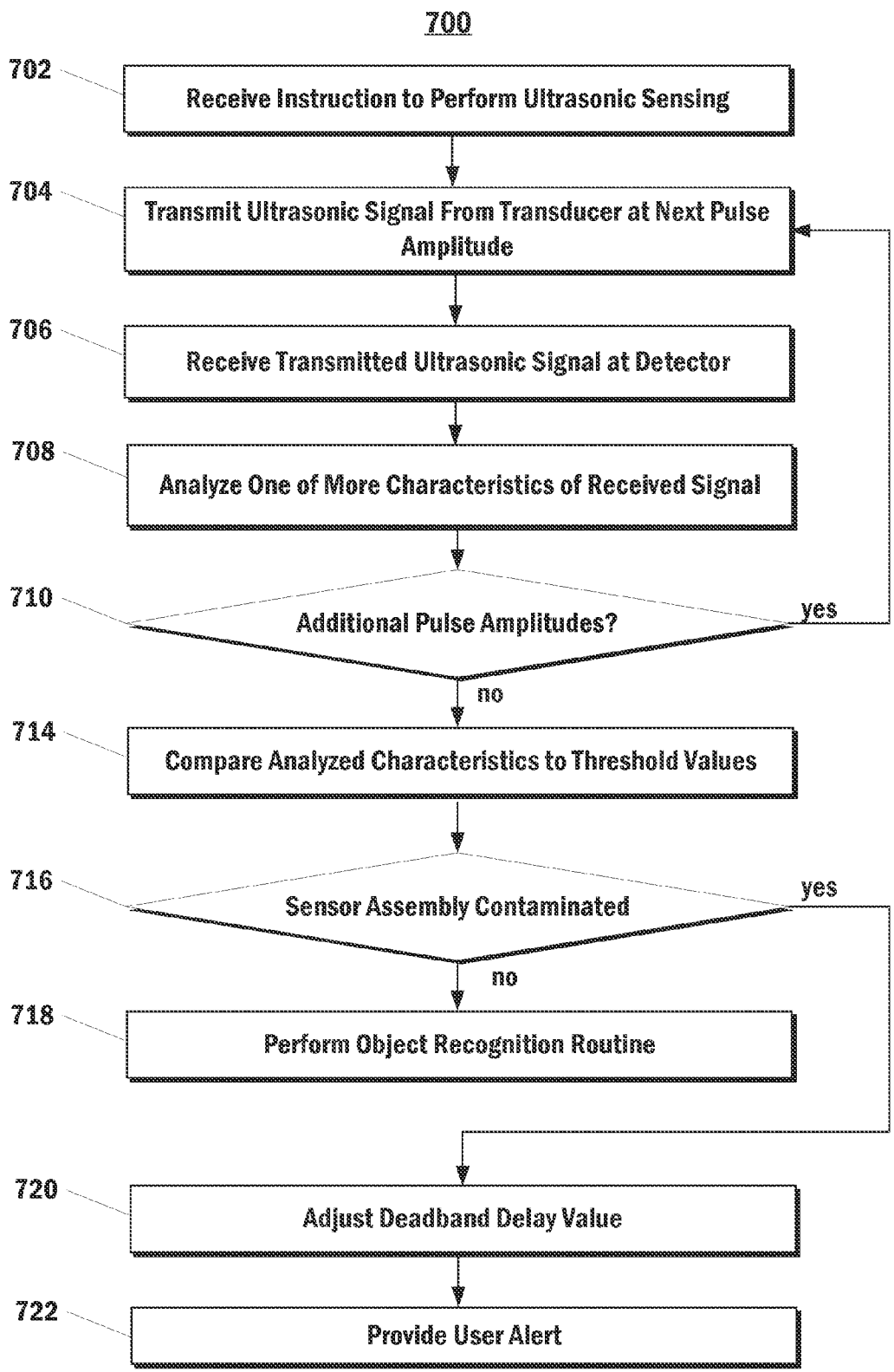
FIG. 7 provides a flowchart of an exemplary method for detecting a contamination status of a refrigerator ultrasonic sensor assembly according to an exemplary embodiment of the present disclosure.

FIG. 7 provides a flowchart of an exemplary method for detecting a contamination status of a refrigerator ultrasonic sensor assembly according to an exemplary embodiment of the present disclosure. Method (700) can be implemented using any suitable appliance or other device, including, for example, refrigerator 100 of FIG. 1. In addition, FIG. 7 depicts steps performed in a particular order for purposes of illustration and discussion. Those of ordinary skill in the art, using the disclosures provided herein, will understand that the various steps method (700) can be omitted, adapted, and/or rearranged in various ways without departing from the scope of the present disclosure.

At (702) the system can receive an instruction to perform ultrasonic sensing using one or both of the ultrasonic sensor assemblies. For example, the ultrasonic sensing can be requested to implement an auto-fill feature of a dispensing assembly of the refrigerator. As such, method (700) can be a sub-routine of a larger method for performing ultrasonic sensing. Method (700) can be performed prior to other processes or can be performed and computed in parallel with other processes.

At (704) an ultrasonic signal of a first pulse amplitude can be transmitted by an ultrasonic transducer. For example, a listing or ordering of a plurality of pulse amplitudes can be accessed from memory and used to instruct the system as to the next pulse amplitude at which an ultrasonic signal should be transmitted.

At (706) the ultrasonic signal transmitted at (704) is received by an ultrasonic detector. In particular, the ultrasonic detector can be included in the same ultrasonic sensor assembly as the ultrasonic transducer used to transmit the signal. A received signal amplitude waveform can be generated and stored in memory.

Figure 8:
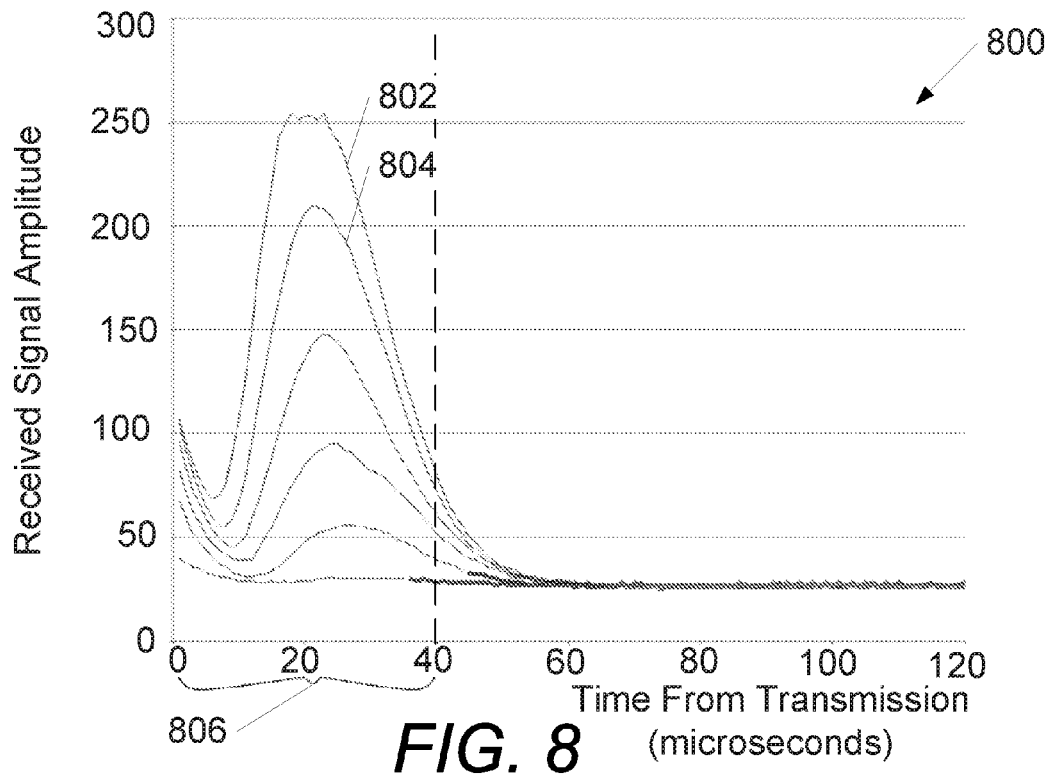
FIG. 8 provides a graphical depiction of a plurality of received ultrasonic signals according to an exemplary embodiment of the present disclosure.
Figure 9:
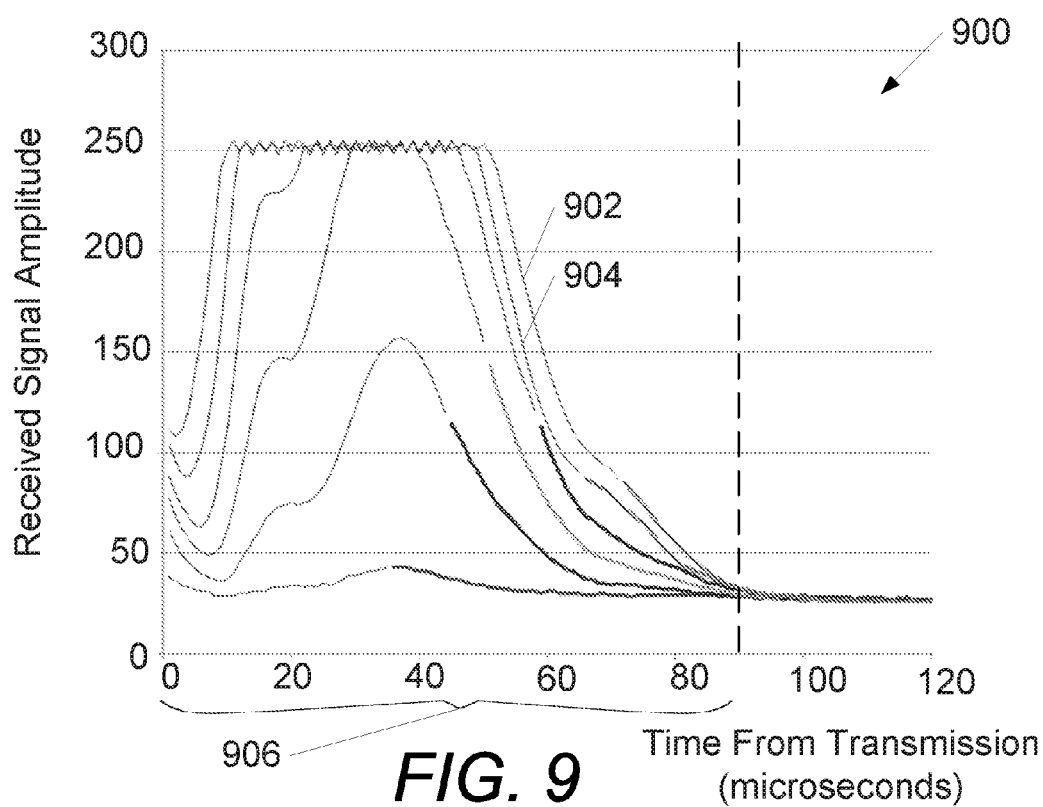
FIG. 9 provides a graphical depiction of a plurality of received ultrasonic signals according to an exemplary embodiment of the present disclosure.

As examples, FIGS. 8 and 9 respectively provide graphical depictions 800 and 900 of a plurality of received ultrasonic signals according to an exemplary embodiment of the present disclosure. In particular, the plurality of received ultrasonic signals depicted in FIG. 8 have been transmitted and received by an ultrasonic sensor assembly that has experienced a moderate degree of contamination, and the plurality of received ultrasonic signals depicted in FIG. 9 have been transmitted and received by an ultrasonic sensor assembly that has experienced a large degree of contamination.

Thus, graphical depictions 600, 800, and 900 demonstrate changes in the received ultrasonic signals as an ultrasonic sensor assembly becomes more contaminated over its operational lifetime. In particular, as the presence of contaminants on the ultrasonic assembly increases, a degree of vibrational isolation of the ultrasonic sensors from the chassis decreases and, therefore, the amount of received crosstalk increases.

On the y-axis of graphical depictions 800 and 900 is the received signal amplitude. For example, plots 802 and 804 of FIG. 8 and plots 902 and 904 of FIG. 9 respectively depict received signal amplitude for received ultrasonic signals.

Shown on the x-axis of graphical depictions 800 and 900 are units of time in microseconds. In particular, the x-axis shows the respective time from transmission for each of the received signals depicted. It will be appreciated that the depicted ultrasonic signals are not necessarily transmitted or received simultaneously, but instead transmitted sequentially and then graphically overlaid so that equivalent times from respective transmissions are aligned.

Also shown in graphical depictions 800 and 900 are deadband delay 806 and deadband delay 906. As discussed above, the deadband delay can be an adjustable system parameter used to prevent false positives resulting from received crosstalk. Although the deadband delays 806 and 906 are shown as a particular value in graphical depictions 800 and 900, any value can be used for the deadband delay. Further, use of a deadband delay is not a mandatory feature of the present disclosure.

Returning to FIG. 7, at (708) one or more characteristics of the ultrasonic signal as received at (708) can be analyzed. For example, exemplary characteristics that can be analyzed for each received signal include, but are not limited to, a maximum received signal amplitude exhibited during a particular time interval; the received signal amplitude exhibited at a specific time from transmission (e.g. 35 microseconds); a total area under the plot of the signal during a particular time interval; an average value during a particular time interval; or any other suitable received signal characteristics, including values of frequency, amplitude, or other signal components. The analyzed characteristic can be stored in memory.

At (710) it can be determined whether an additional ultrasonic signal at an additional pulse amplitude should be transmitted. A list or ordering stored in memory can be accessed or consulted to aid the determination at (710).

If it is determined at (710) that additional ultrasonic signals should be transmitted, then method (700) can return to (704) and transmit an ultrasonic signal from the ultrasonic transducer at the next pulse amplitude. In such fashion, a plurality of ultrasonic signals can be transmitted at a plurality of pulse amplitudes for each iteration of method (700). Further, one or more characteristics of each of such signals can be analyzed and stored in memory.

However, if it is determined at (710) that additional ultrasonic signals are not desired, then method (700) can proceed to (714). At (714) the plurality of analyzed characteristics can be respectively compared to a plurality of threshold values. As an example, the threshold values can be the respective calibration values determined for each pulse amplitude during a previously performed calibration routine of method (500). Alternatively, the threshold values can simply be programmed into memory by the manufacturer and accessed at (714).

As an example of a comparison that can be performed at (714), it can be determined whether each of the one or more analyzed characteristics for each received ultrasonic signal is greater than or less than a respective threshold value. As another example, at (714) a variance between each respective threshold value and each of the one or more analyzed characteristics for each received signal can be respectively determined.

At (716) it can be determined whether the sensor assembly is in a contaminated state. In particular, the results of the respective comparisons performed at (714) can inform the determination at (716).

As an example, if a majority of the analyzed characteristics across all received ultrasonic signals are greater than their respective threshold values, then it can be determined that the sensor assembly is contaminated. As another example, if any analyzed characteristic is greater than its respective threshold value, then it can be determined that the sensor assembly is contaminated.

As yet another example, in implementations that compute a variance for each analyzed characteristic at (714), the resulting variances can be summed together at (716) to generate a global variance. If the global variance is greater than zero or other global threshold value, it can be determined that the sensor assembly is contaminated.

If it is determined at (716) that the sensor assembly is not contaminated, then method (700) can proceed to (718) and perform an object recognition routine or otherwise operate under according to standard procedure.

However, if it is determined at (716) that the sensor assembly is contaminated, then method (700) can proceed to (720).

At (720) the deadband delay value can be adjusted. For example, the deadband delay can be increased. As an example, with reference to FIGS. 8 and 9 it can be seen that deadband delay 806 extends to 40 microseconds after transmission while deadband delay 906 has been increased to 90 microseconds after transmission. In such fashion, false positives that might result from the increased duration and magnitude of received crosstalk can be reduced.

The deadband delay can be increased by a preset amount or can be increased based on the most recently received signals. For example, with reference to FIG. 9, it can be seen that deadband delay 906 has been increased to equal the time from transmission at which the received signal amplitudes first return to a baseline level following reception of the crosstalk component. Other system parameters can be adjusted as well.

Returning to FIG. 7, at (722) a user alert can be provided. For example, a display or other graphical user interface can provide a graphical alert that requests the user clean or replace the ultrasonic sensor assembly. For example, detailed instructions can be provided so that the user can clean the sensor assembly in the proper fashion. Other alerts or alarms can be used as well, such as audible alerts, lights, or other error notifications.

Alternatively, an auto-fill feature or other refrigerator features reliant upon precise accuracy of the ultrasonic sensor assembly can be temporarily disabled until the sensor assembly is properly cleaned or replaced.

As yet another example, a timer can be started upon the inaugural system initialization. Upon expiration of the timer, the system can remind or prompt the user to clean the ultrasonic sensor assembly. In such fashion, contamination issues can be proactively eliminated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator, comprising:
   a sensor assembly comprising:
      a first ultrasonic sensor configured to transmit an ultrasonic signal; and
      a second ultrasonic sensor configured to receive the ultrasonic signal;
   wherein the refrigerator is configured to perform operations comprising:
      operating the sensor assembly to send and receive the ultrasonic signal;
      comparing an amount of received crosstalk to a threshold value; and
      determining the contamination status of the sensor assembly based on the comparison of the amount of received crosstalk to the threshold value;
   wherein determining a contamination status of the sensor assembly based on the comparison comprises detecting that the sensor assembly is contaminated when the amount of received crosstalk is greater than the threshold value.

2. The refrigerator of claim 1, wherein the refrigerator is configured to perform further operations comprising performing a calibration routine upon a system initialization to obtain the threshold value.

3. The refrigerator of claim 1, wherein the refrigerator is configured to perform further operations comprising:
   determining the amount of received crosstalk, wherein determining the amount of received crosstalk comprises determining a first amplitude of the received ultrasonic signal at a first time, the first time being before a predetermined amount has elapsed since a time of transmission of the ultrasonic signal from the first ultrasonic sensor.

4. The refrigerator of claim 3, wherein the refrigerator is configured to perform further operations comprising determining the threshold value by performing a calibration routine upon a system initialization.

5. The refrigerator of claim 1, wherein the refrigerator is configured to perform further operations comprising providing a user alert when it is detected that the sensor assembly is contaminated.

6. The refrigerator of claim 1, wherein the refrigerator is configured to perform further operations comprising:
   analyzing a portion of the ultrasonic signal received after a deadband delay to detect the presence of an object within a proximity of the sensor assembly, the deadband delay comprising an amount of time after a time of transmission of the ultrasonic signal from the first ultrasonic sensor; and
   increasing the deadband delay when it is detected that the sensor assembly is contaminated.

7. The refrigerator of claim 1, wherein the first ultrasonic sensor comprises an ultrasonic transducer and the second ultrasonic sensor comprises an ultrasonic detector.

8. A method for determining a contamination status of an ultrasonic sensor assembly included in a refrigerator appliance, the method comprising:
   operating the ultrasonic sensor assembly to send and receive one or more ultrasonic signals;
   comparing an amount of received crosstalk to a threshold value; and
   determining the contamination status of the ultrasonic sensor assembly based on the comparison of the amount of received crosstalk to the threshold value;
   wherein determining the contamination status of the ultrasonic sensor assembly based on the comparison comprises detecting that the ultrasonic sensor assembly is contaminated when the amount of received crosstalk is greater than the threshold value.

9. The method of claim 8, wherein:
   the ultrasonic sensor assembly comprises:
      a chassis;
      an ultrasonic transducer; and
      an ultrasonic detector; and
   the received crosstalk comprises vibrations transmitted from the ultrasonic transducer to the ultrasonic detector via the chassis.

10. The method of claim 8, wherein:
   the ultrasonic sensor assembly comprises:
      an ultrasonic transducer; and
      an ultrasonic detector; and
   the amount of received crosstalk comprises a first voltage generated by the ultrasonic detector at a first time following transmission of the one or more ultrasonic signals by the ultrasonic transducer.

11. The method of claim 8, wherein:
   operating the ultrasonic sensor assembly to send and receive the one or more ultrasonic signals comprises:
      respectively transmitting a plurality of ultrasonic signals, each ultrasonic signal having a pulse amplitude; and
      respectively receiving the plurality of ultrasonic signals, the plurality of received ultrasonic signals respectively exhibiting a plurality of received crosstalk amplitudes; and
   comparing the amount of received crosstalk to the threshold value comprises respectively comparing the plurality of received crosstalk amplitudes to a plurality of threshold values.

12. The method of claim 11, wherein determining the contamination status of the ultrasonic sensor assembly based on the comparison comprises detecting that the ultrasonic sensor assembly is contaminated when a majority of the plurality of received crosstalk amplitudes are greater than their respective threshold values.

13. The method of claim 11, wherein:
   respectively comparing the plurality of received crosstalk amplitudes to a plurality of threshold values comprises respectively determining a plurality of variances for the plurality of received crosstalk amplitudes, each variance for each received crosstalk amplitude describing a difference between such received crosstalk amplitude and the respective threshold value to which it was compared; and
   determining the contamination status of the ultrasonic sensor assembly based on the comparison comprises:
      summing the plurality of variances to obtain a global variance; and
      detecting that the ultrasonic sensor assembly is contaminated when the global variance is greater than a global threshold value.

14. The method of claim 8, further comprising increasing a deadband delay value when the ultrasonic sensor assembly is determined to be contaminated, the deadband delay value describing an interval of time after transmission of each of the one or more ultrasonic signals in which the corresponding received ultrasonic signal is not analyzed for object detection.

* * * * *